United States Patent
Shimokawa et al.

(10) Patent No.: US 6,461,030 B1
(45) Date of Patent: Oct. 8, 2002

(54) ILLUMINATOR FOR OPTICAL MEASURING INSTRUMENT

(75) Inventors: Seiji Shimokawa, Kawasaki (JP); Shunsaku Tachibana, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/512,765

(22) Filed: Feb. 25, 2000

(30) Foreign Application Priority Data

Mar. 1, 1999  (JP) .......................................... 11-052649

(51) Int. Cl.$^7$ .............................................. G01B 11/02
(52) U.S. Cl. ..................... 362/551; 362/277; 362/280; 362/319; 362/281; 362/575
(58) Field of Search ................................. 362/268, 253, 362/216, 800, 551, 560, 554, 277, 280, 252, 235, 281, 319, 575; 355/67, 77; 359/822, 823, 387, 389, 390, 355, 798, 799, 800, 801, 813

(56) References Cited

U.S. PATENT DOCUMENTS

| | | | |
|---|---|---|---|
| 2,004,806 A | | 6/1935 | Ellestad |
| 3,930,713 A | | 1/1976 | Stankewitz et al. |
| 3,999,855 A | | 12/1976 | Hirschfeld |
| 4,391,519 A | * | 7/1983 | Kuwabara et al. .......... 356/153 |
| 5,052,338 A | * | 10/1991 | Maiorca et al. ............. 356/375 |
| 5,283,802 A | * | 2/1994 | Hsiung ....................... 372/107 |
| 5,424,838 A | * | 6/1995 | Siu ............................. 356/394 |
| 5,430,620 A | * | 7/1995 | Li et al. ..................... 362/105 |
| 5,496,995 A | * | 3/1996 | Kato et al. .................. 250/216 |
| 5,552,892 A | | 9/1996 | Nagayama |
| 5,580,163 A | | 12/1996 | Johnson, II |
| 5,584,568 A | * | 12/1996 | Corbasson et al. ......... 362/268 |
| 5,644,400 A | * | 7/1997 | Mundt ........................ 356/400 |
| 5,691,803 A | * | 11/1997 | Song et al. .................... 355/55 |
| 5,880,861 A | * | 3/1999 | Nishida ........................ 359/15 |
| 5,883,704 A | * | 3/1999 | Nishi et al. .................... 355/67 |
| 5,920,380 A | * | 7/1999 | Sweatt ......................... 355/77 |
| 5,959,759 A | * | 9/1999 | Hamada ..................... 359/204 |
| 6,181,471 B1 | * | 1/2001 | Miyoshi ..................... 359/388 |

FOREIGN PATENT DOCUMENTS

| | | |
|---|---|---|
| DE | 375731 | 6/1932 |
| EP | 458096 A1 | 11/1991 |
| EP | 525948 A2 | 2/1993 |
| JP | 6-180427 | 6/1994 |
| JP | 6-235821 | 8/1994 |
| JP | 07-23208 | 4/1995 |
| JP | 8-166514 | 6/1996 |

OTHER PUBLICATIONS

European Search Report.

* cited by examiner

*Primary Examiner*—Thomas M. Sember
(74) *Attorney, Agent, or Firm*—Oliff & Berridge, PLC

(57) ABSTRACT

Illumination angle adjuster (42) for condensing illumination light from a light generator (41) toward a workpiece (25) includes a simple-structured optical member of condenser lens (44). With the simple arrangement, illumination angle of the illumination light to the workpiece (25) can be easily changed by moving the condenser lens (44) along an optical axis of an optical system (37).

4 Claims, 8 Drawing Sheets

F I G. 5
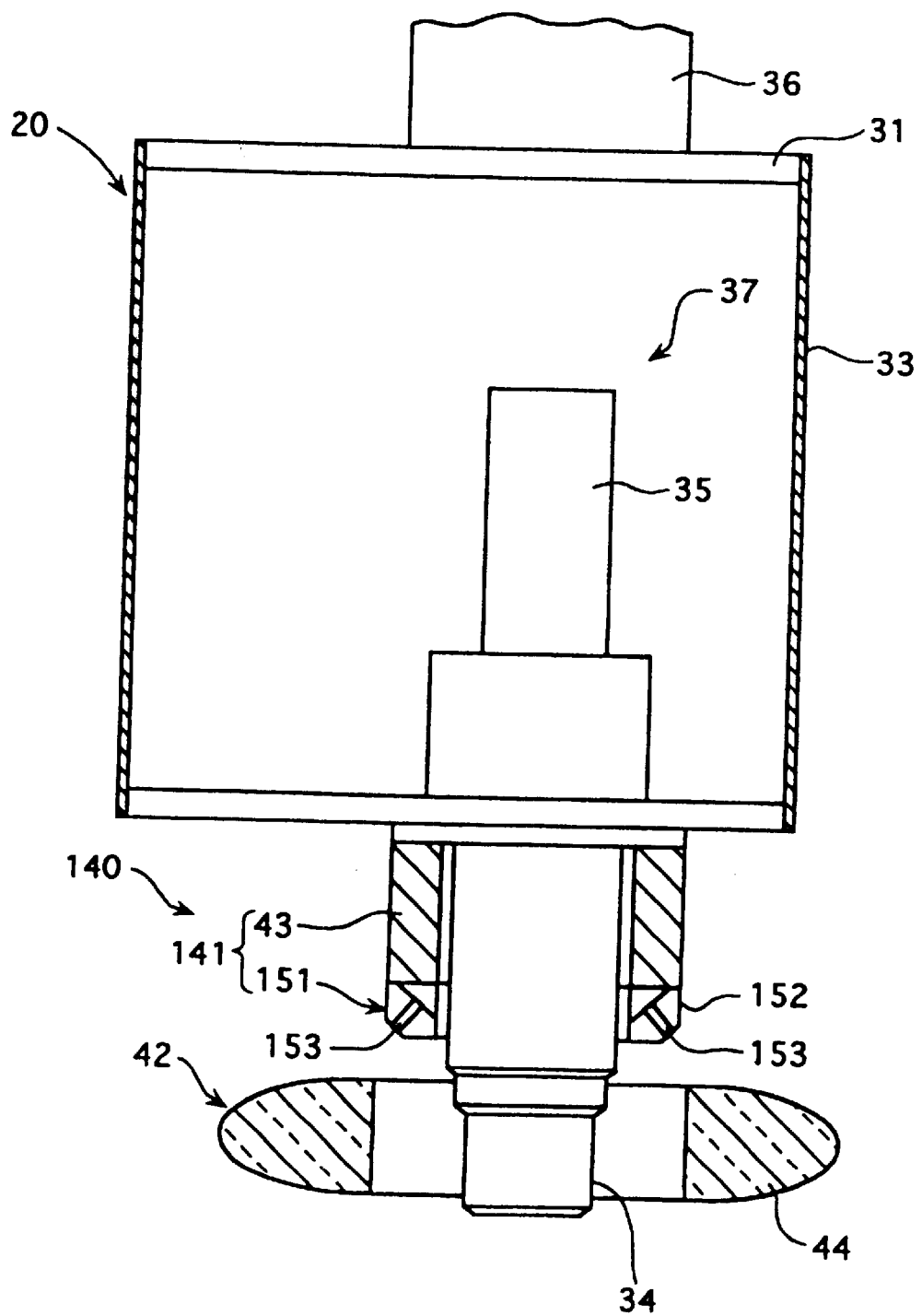

ILLUMINATOR FOR OPTICAL MEASURING INSTRUMENT

BACKGROUND OF THE INVENTION

1. Field of the Invention

The present invention relates to an illuminator used for image processing measuring instrument and other optical measuring instrument for measuring dimension and profile of a workpiece based on an image of the workpiece obtained through an optical system. More specifically, it relates to an improvement of an illuminator for irradiating illumination light to the workpiece from a direction slanting relative to an optical axis of the optical system.

2. Description of Related Art

In an image processing measuring instrument for optically magnifying a target portion of a workpiece by a magnifying optical system to measure a dimension and profile of the workpiece based on the magnified image, such as a tool maker's microscope, a projector and a visual-type coordinates measuring machine, illumination to the workpiece plays an important role for obtaining the magnified image of the workpiece.

Conventionally, a vertical downward illumination method, in which the illumination light is irradiated onto the workpiece approximately from right above, has been known as an illumination method of the image processing measuring instrument. However, the vertical downward illumination method is often used for measuring a workpiece having relatively simple profile, and is not suitable for measuring a workpiece having complicated profile such as a step-shaped workpiece having a large number of edge portion, where shadow of the edge portion is sometimes blurred on the display.

To solve the above disadvantage, following illuminators have been proposed for clearly detecting the shadow of the edge portion by irradiating the illumination light onto the workpiece in a direction slanting at a predetermined angle relative to an optical axis of the magnifying optical system.

Conventional example 1 has a fiber illuminator for irradiating the illumination light parallel to the above-described optical axis of the optical system, a parabolic mirror for reflecting the illumination light from the fiber illuminator in a direction approximately orthogonal with the optical axis of the optical system and a ring mirror for condensing the illumination light reflected by the mirror onto the workpiece.

In the conventional example 1, illumination angle relative to the target portion is changed by adjusting advancement and retraction of the parabolic mirror relative to the illuminator and relative position of the ring mirror on the optical axis.

Conventional example 2 has the same fiber illuminator, a ring-shaped condenser lens for refracting the illumination light to be away from the optical axis of the optical system, and a ring-shaped reflecting member for condensing the illumination light refracted by the condenser lens (Japanese Utility Model Laid-Open Publication No. Hei 7-23208).

The conventional example 2 has a plurality of petal-like mirror piece disposed on a circle around a center of the optical axis with a part thereof being sequentially overlaid, an end of the mirror piece opening and closing to change the illumination angle of the workpiece.

Conventional example 3 has a plurality of LED directed to the workpiece around the optical axis for irradiating the light, lighting position of the LED being controlled to change the illumination angle.

Conventional example 4 has a ring-shaped lens around the optical system and the angle of the light irradiated onto the workpiece is adjusted by moving the light source in radial direction of the lens above the ring-shaped lens.

Conventional example 5 uses a peripheral portion of an objective remote from the optical axis of the objective for obliquely irradiating the illumination light onto the workpiece (Japanese Patent Laid-Open Publication No. Hei 8-166514).

Conventional example 6 has a reflection mirror for reflecting the illuminating light irradiated from the light source, and a stationary fresnel lens for condensing the illumination light reflected by the mirror to the workpiece.

However, following problems occurs in the above conventional examples.

In the conventional example 1, the reflection surface of respective mirrors has to be formed to have parabolic cross section for obtaining predetermined reflection light from the fiber illuminator with the use of two pairs of mirror, which requires high-leveled surface processing, thus increasing production cost. Further, complicated moving mechanism is required for relatively moving the mirrors, thereby also increasing production cost.

Since the conventional example 2 has a complicated structure of the plurality of the petal-like mirror piece, and the ring-shaped reflecting member is opened and closed by synchronously moving all the mirror pieces, adjustment of the illumination light onto the workpiece is difficult.

In the conventional example 4, since the size of the ring-shaped lens increases in order for obtaining large illumination angle, there is limitation in changing the illumination angle. Further, the illumination angle cannot be changed when a ring-shaped fiber illuminator is used as the light source. Accordingly, linear fiber illuminator has to be used, which can cause illumination uniformity in measuring a cylindrical workpiece.

Since the illumination angle of the conventional example 5 is determined in accordance with diameter of the objective etc., the illumination angle cannot be changed.

In conventional example 6, since the fresnel lens is fixed, the illumination angle cannot be changed as in the conventional example 5.

SUMMARY OF THE INVENTION

An object of the present invention is to solve the above conventional problems and to provide an illuminator for optical measuring instrument having a simple configuration and being capable of easily changing illumination angle toward the workpiece.

For achieving the object, the present invention refracts the illumination light from a light generator by a condenser lens to be condensed onto the optical axis and changes the illumination angle by moving the condenser lens along the optical axis.

Specifically, an illuminator for optical measuring instrument according to the present invention has: a light generator for generating illumination light radially from a center of an optical axis of an optical system toward outside; and an illumination angle adjuster for condensing the illumination light from the light generator toward a workpiece, the illumination angle adjuster having a condenser lens for refracting the illumination light from the light generator and being movable along the optical axis.

According to thus arranged present invention, the illumination light generated by the light generator is irradiated onto the workpiece by the condenser lens constituting the illumination angle adjuster. In order to change the illumination angle of the illumination light to the workpiece, the condenser lens is moved along the optical axis. For instance, for narrowing the illumination angle of the illumination light irradiated onto the workpiece, the condenser lens is put on a position adjacent to the light generator. Then, the illumination light generated by the light generator is refracted by an inner side portion of the condenser lens to be irradiated on the workpiece at a small angle.

On the other hand, for enlarging the illumination angle, the condenser lens is put on a position remote from the light generator. Then, the illumination light generated by the light generator is refracted by a peripheral portion of the condenser lens to be irradiated onto the workpiece at a large angle.

Accordingly, the illumination angle of the illumination light can be easily changed by arranging the illumination angle adjuster with a simple structure of the condenser lens and by moving the condenser lens along the optical axis.

In the above arrangement, the condenser lens may preferably be an annular lens disposed coaxially with the optical axis of the optical system.

Accordingly, the illumination light reflected by the workpiece can be observed by the optical system through the optical axis of the optical system without being blocked by the annular lens, thus achieving proper measurement.

The condenser lens may be arranged in plural.

Accordingly, the illumination angle to the workpiece can be fine adjusted by placing the condenser lenses along the optical axis and by adjusting relative distance thereof.

The light generator may have a fiber illuminator formed in a ring-shape with the optical axis as a center thereof or a LED illuminator formed in a ring-shape with the optical axis as a center thereof.

According to the above arrangement, light volume and/or irradiation position can be easily changed by selectively switching on and off the fiber illuminator or the LED illuminator.

BRIEF DESCRIPTION OF THE DRAWINGS

FIG. 5 is a view showing primary portion of the second embodiment corresponding to FIG. 2;

DETAILED DESCRIPTION OF PREFERRED EMBODIMENT(S)

Figure 1:
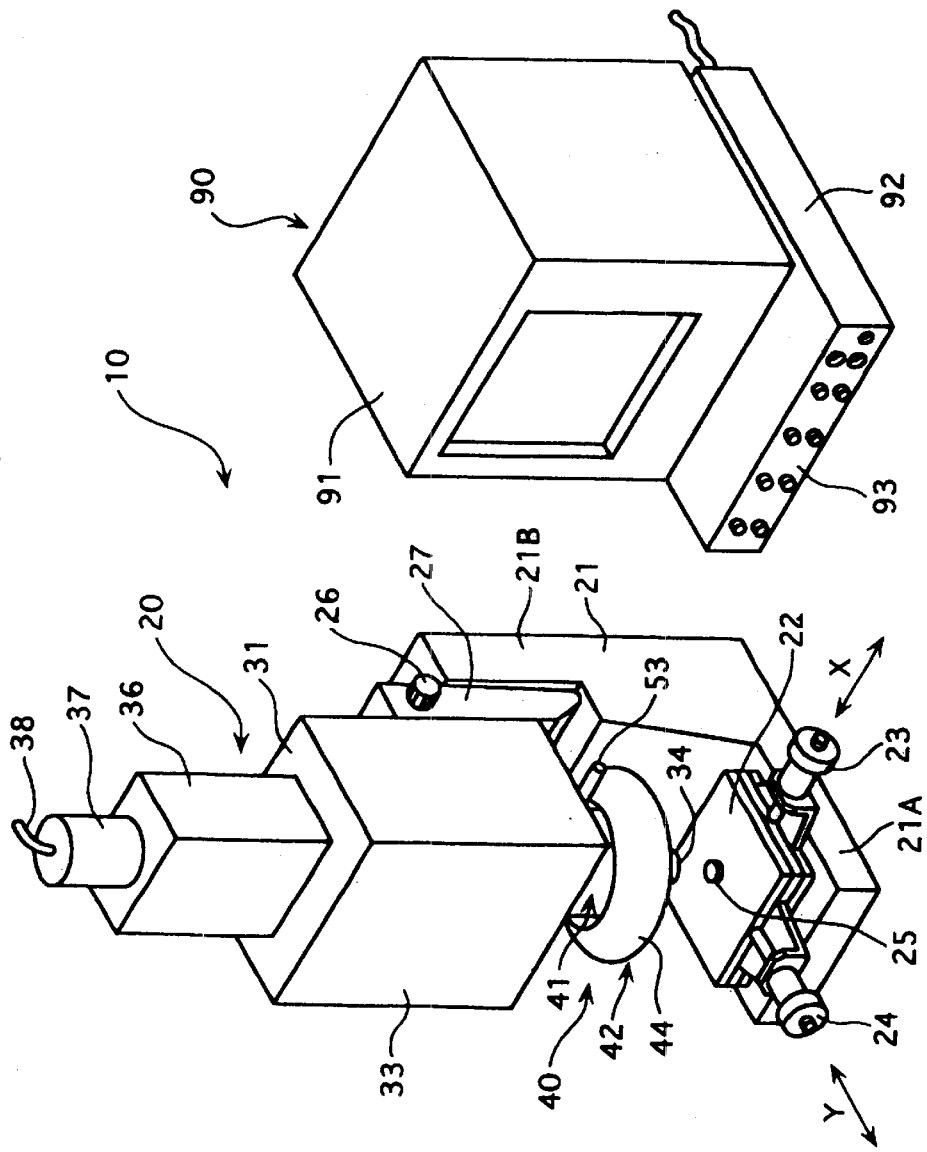
FIG. 1 is a perspective view showing a tool maker's microscope to which first embodiment of the present invention is applied.

A preferred embodiment of an illuminator of the present invention will be described below in detail with reference to attached drawings. Incidentally, the same reference numeral will be attached to the same component for omitting or simplifying the description thereof.

First Embodiment

First embodiment is shown from FIG. 1 to FIG. 4. FIG. 1 shows an example for applying the present invention to an image processing measuring instrument. Broadly speaking, the image processing measuring instrument is composed of a microscope 20 and an image display 90.

The microscope 20 includes a support base 21 having L-shaped side face, the support base 21 having a horizontal portion 21A and an upright portion 21B. A table 22 for a workpiece 25 to be put thereon is provided on an upper surface of the horizontal portion 21A of the support base 21. The table 22 is constructed of a X-Y table capable of moving in orthogonal and biaxial direction on a horizontal surface, i.e. right and left direction (X-axis direction) and front and back direction (Y-axis direction) and movement amount in respective axial direction can be adjusted and/or measured by a X-axis micrometer head 23 and a Y-axis micrometer head 24.

A lift guide 27 having a lift knob 26 is disposed on the upright portion 21B of the support base 21. A support frame 31 having square C-shaped side face is elevatably supported by the lift guide 27 to be elevatable by rotating the lift knob 26 through rack and pinion (not shown). Both right and left ends of front open side of the support frame 31 respectively have cylindrical body (not shown) and a cover 33 having square C-shaped plane is attached to an open side of the support frame 31.

Figure 2:
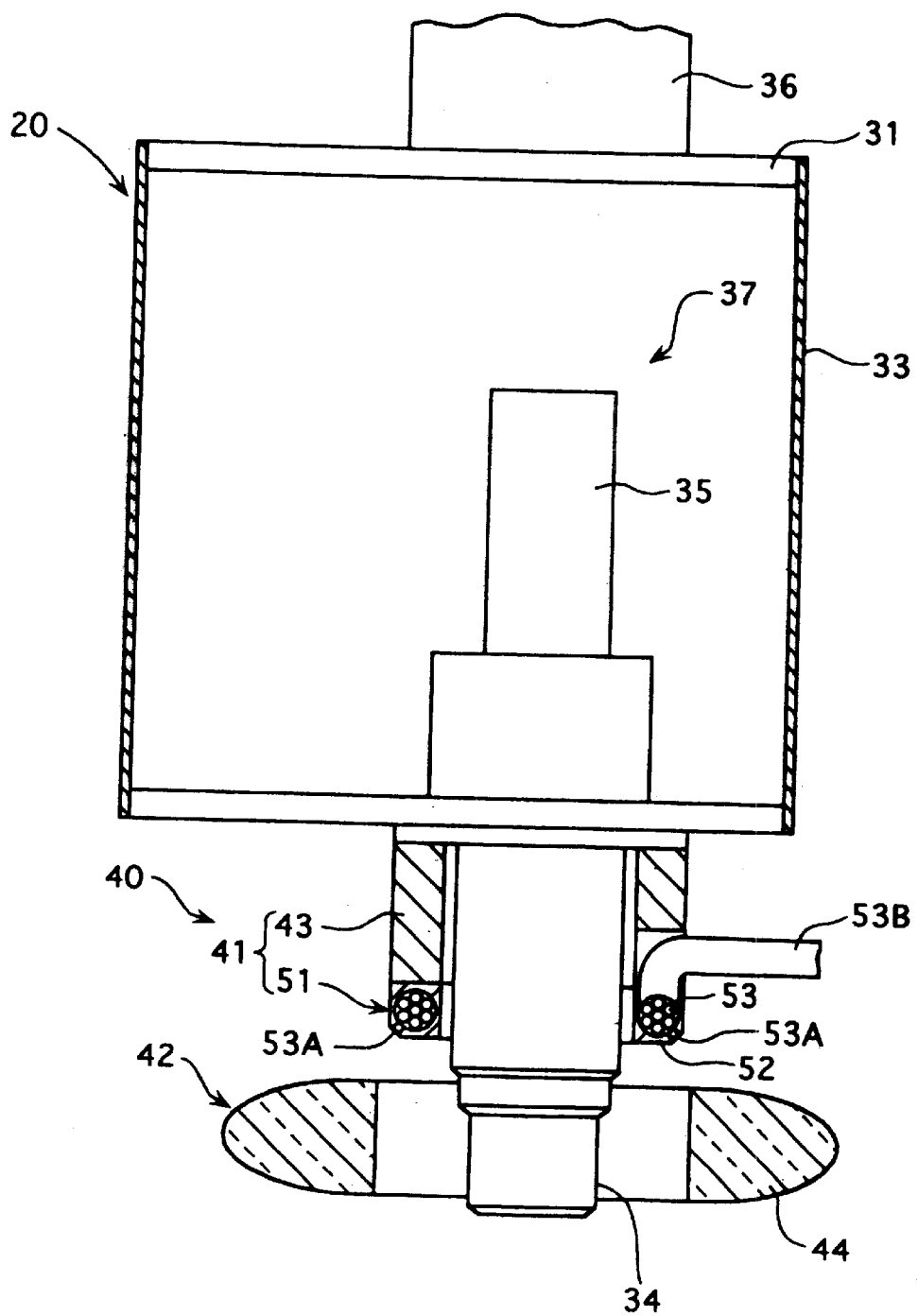
FIG. 2 is a cross section showing primary portion of the first embodiment.

An imaging optical system 37 is provided at a central portion of the support frame 31. As shown in FIG. 2, the imaging optical system 37 is composed of an objective 34 projecting below the support frame 31, an tube lens 35 provided coaxially with the objective 34, and a CCD camera 36 provided coaxially with the tube lens 35 and projecting on the support frame 31. The image display 90 is connected to the CCD camera 36 via wiring cord 38.

An illuminator for optical measuring instrument 40 according to the present embodiment is provided on a lower part of the support frame 31.

The illuminator for optical measuring instrument 40 includes a ring-shaped light generator 41 for generating radial illumination light toward the outside around an optical axis of the imaging optical system 37, and an illumination angle adjuster 42 for condensing the illumination light from the light generator 41 toward the workpiece 25.

The light generator 41 has a fiber illuminator 51 having ring-shape with the optical axis as a center thereof for irradiating illumination light down-outward and a cylindrical member 43 for attaching the fiber illuminator 51 to the support frame 31.

The cylindrical member 43 and the fiber illuminator 51 are disposed coaxially with the optical axis and a predetermined gap is formed between an inner circumference thereof and an outer circumference of the objective 34.

Figure 3:
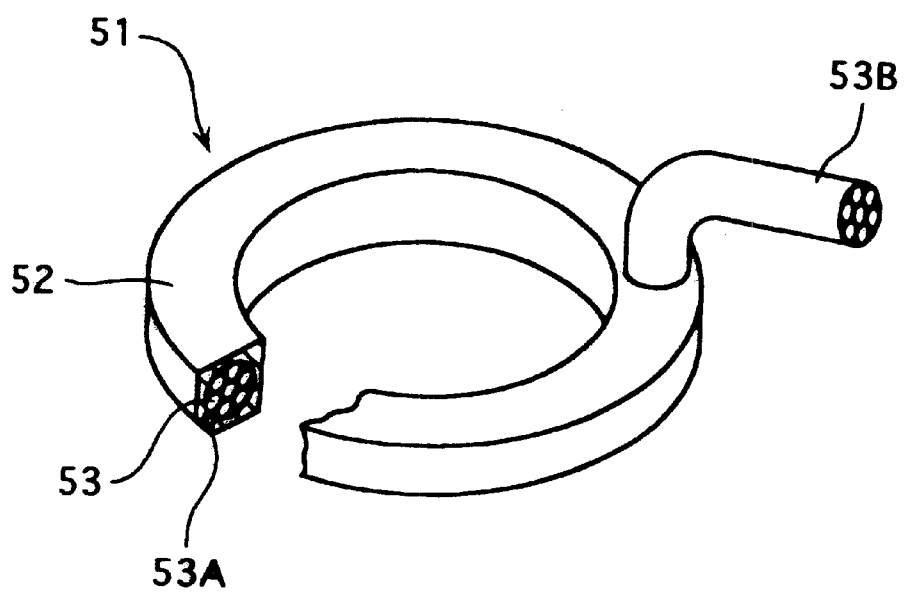
FIG. 3 is an upside perspective view showing a fiber illuminator of the first embodiment.

As shown in FIG. 3, the fiber illuminator 51 is composed of a ring-shaped member 52 having circular space thereinside, and a plurality of optical fiber 53 bundled and accommodated in the circular space of the ring-shaped member 52.

A fiber tip 53A of respective optical fibers 53 is circularly aligned and respectively directed obliquely downward to the ring-shaped member 52. Incidentally, a fiber bundle 53B of the respective optical fibers 53 is connected to a light source (not shown).

The fiber illuminator 51 is arranged so that the illumination light can be partially generated by selectively switching on and off the respective optical fibers 53.

The illumination angle adjuster 42 includes a condenser lens 44 for condensing the illumination light from the light generator 41 onto the optical axis and a driving mechanism (not shown) for manually or automatically elevating the condenser lens 44 along the optical axis.

The condenser lens 44 is an annular lens having an axial core in conformity with the optical axis. The condenser lens 44 has a larger inner circumference dimension than the outer circumference of the objective 34 in order not to interfere with the objective 34.

The condenser lens 44 may be constructed of various lenses such as aspheric, oval, parabolic, and fresnel lens, and any configuration can be used as long as the lens can condense the illumination light onto the optical axis.

The image display 90 is composed of a CRT 91 and a controller 92 for displaying signal from the CCD camera 36 on the display 91. The controller 92 has a console 93 having knob, switch or the like for conducting the above-described control operation on a front portion thereof.

A function of the first embodiment will be described with reference to FIG. 4.

In initiating measurement, the X-axis and Y-axis micrometer head 23 and 24 of the table 22 are rotated so that the workpiece 25 being put on the table 22 opposes the objective 34. And the lift knob 26 is rotated so that the target portion of the workpiece 25 is located on a focal point of the objective 34.

Figure 4:
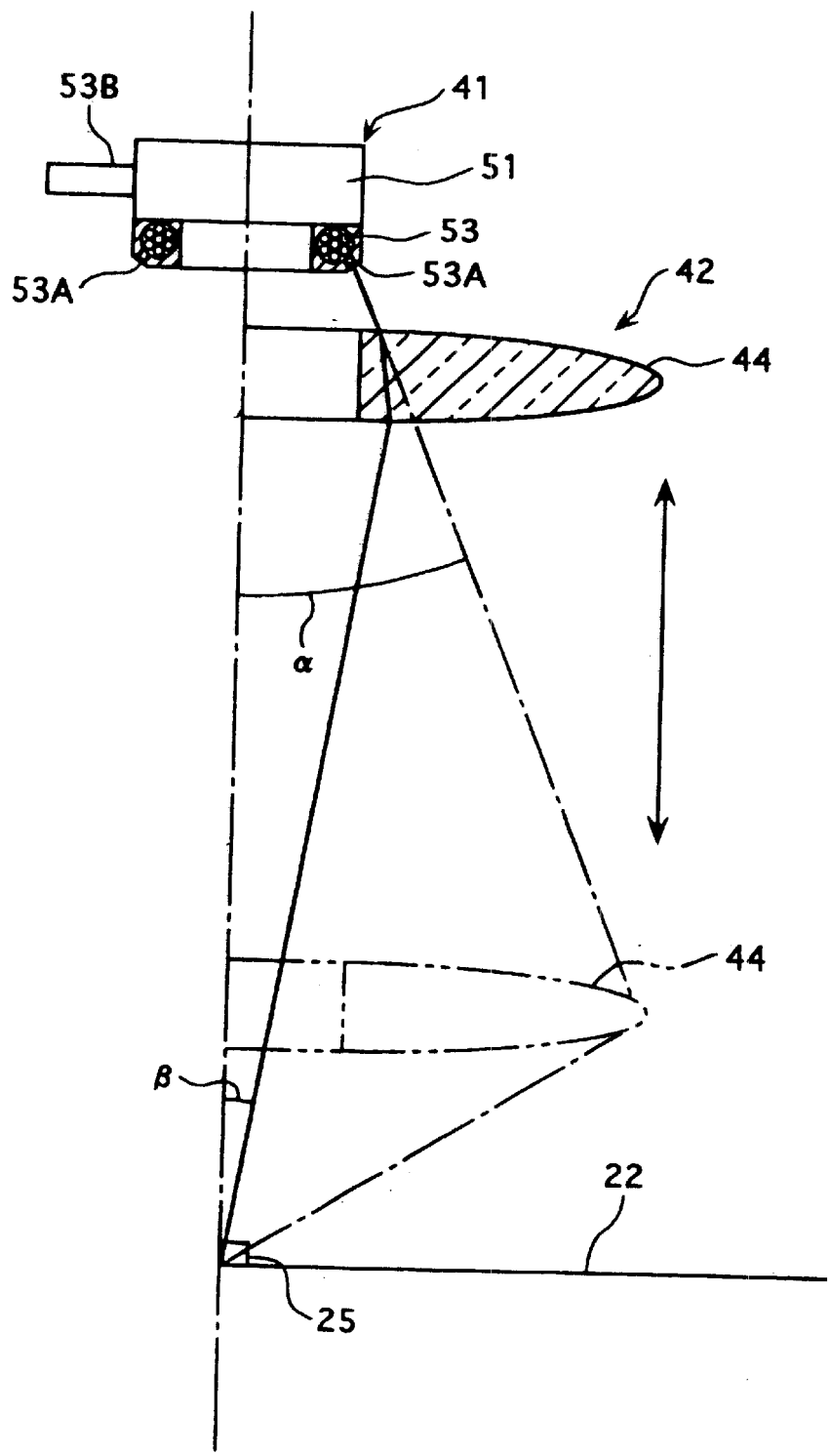
FIG. 4 is a schematic diagram for explaining a function of the first embodiment.

At the above condition, as shown in FIG. 4, the light irradiated from the fiber illuminator 51 of the light generator 41 with a spread angle α from the optical axis is condensed by the condenser lens 44 to be irradiated on the workpiece 25.

The reflection light from the workpiece 25 enters the CCD camera 36 through the objective 34 and the tube lens 35, which is then converted to an electric signal by the CCD camera 36 to be inputted into the controller 92 of the image display 90. Consequently, the image of the workpiece 25 is displayed on the CRT 91.

For changing the illumination angle of the illumination light to the workpiece 25, the condenser lens 44 is moved along the optical axis by the driving mechanism (not shown).

For instance, for narrowing the illumination angle β of the illumination light irradiated onto the workpiece 25, the condenser lens 44 is put on a position adjacent to the fiber illuminator 51 of the light generator 41 as shown in solid line of FIG. 4. Then, the illumination light generated by the fiber illuminator 51 is refracted by an inner side portion of the condenser lens 44 to be irradiated on the workpiece 25 at a small angle.

On the other hand, for enlarging the illumination angle β, the condenser lens 44 is put on a position remote from the fiber illuminator 51 as shown in imaginary line of FIG. 4. Then, the illumination light generated by the fiber illuminator 51 is refracted by a peripheral portion of the condenser lens 44 to be irradiated on the workpiece 25 at a large angle.

Incidentally, light volume and irradiation position of the illumination light are adjusted by selectively switching on and off the fiber illuminator 51.

According to the first embodiment, following effect can be obtained.

(1) Since the illumination angle adjuster 42 for condensing the illumination light from the light generator 41 toward the workpiece 25 includes a simply-structured optical member of the condenser lens 44 being movable along the optical axis of the imaging optical system 37, the illumination angle of the illumination light toward the workpiece 25 can be easily changed.

Accordingly, the illumination light can be irradiated at a proper angle in accordance with the profile of the edge portion of the workpiece etc., thus clearly imaging the image of the edge portion etc. of the workpiece 25 without impairing cubic effect thereof (2) Since the condenser lens 44 is an annular lens having axial core corresponding to the optical axis of the imaging optical system 37, the illumination light reflected to the workpiece 25 passing through the optical axis can be observed by the imaging optical system 37 without being blocked by the condenser lens 44, thus securing appropriate measurement.

(3) Since the light generator 41 includes a fiber illuminator 51 having a ring-shape around the center of the optical axis of the imaging optical system 37, the light volume and the irradiation position can be easily changed by selectively switching on and off the fiber illuminator 51.

Second Embodiment

Next, second embodiment of the present invention will be described below with reference to FIG. 5 and FIG. 6.

In the second embodiment, light generator 141 differs from the light generator 41 of the first embodiment and the rest of the arrangement is the same as the first embodiment.

In FIG. 5, an illuminator for optical measuring instrument 140 according to the present embodiment is provided to a lower part of the support frame 31 of the microscope 20.

The illuminator for optical measuring instrument 140 includes a ring-shaped light generator 141 for radially generating illumination light around a center of the imaging optical system 37 toward outside and the illumination angle adjuster 42 disposed coaxially with the optical axis of the imaging optical system 37.

The light generator 141 has a LED illuminator 151 having ring-shape with the optical axis as a center thereof for irradiating the illumination light to down-outward direction, and a cylindrical member 43 for attaching the LED illuminator 151 to the support frame 31.

The cylindrical member 43 and the LED illuminator 151 are disposed coaxially with the optical axis and a predetermined gap is formed between the inner circumference thereof and the outer circumference of the objective 34.

The LED illuminator 151 is composed of ring-shaped frame 152 and a plurality of light emission element 153 disposed inside the frame 152.

Respective luminous elements 153 are circularly aligned and directed obliquely downward to the frame 152.

The LED illuminator 151 can partially generate the illumination light by selectively switching on and off the respective luminous elements 153.

Next, a function of the second embodiment will be described below with reference to FIG. 6.

In initiating measurement, as in the first embodiment, the workpiece 25 is put on the table 22 to oppose the objective 34 and the target portion of the workpiece 25 is located on a focal point of the objective 34.

Figure 6:
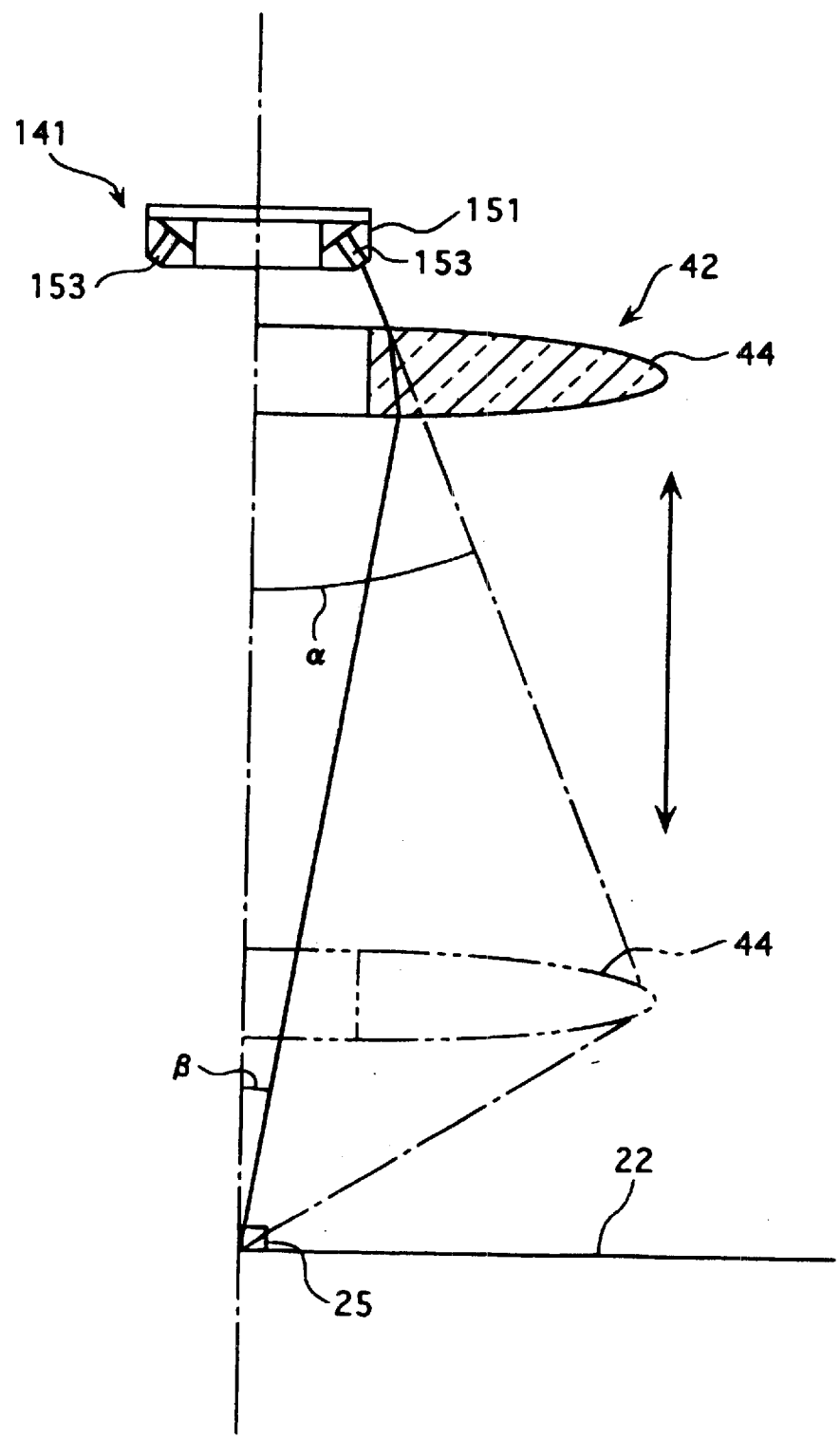
FIG. 6 is a schematic diagram for explaining a function of the second embodiment.

At the above condition, as shown in FIG. 6, the light irradiated from the LED illuminator 151 of the light generator 141 with a spread angle 60 from the optical axis is condensed by the condenser lens 44 to be irradiated on the workpiece 25.

For changing the illumination angle of the illumination light to the workpiece 25, as in the first embodiment, the condenser lens 44 is moved along the optical axis by a driving mechanism (not shown).

For instance, for narrowing the illumination angle β of the illumination light irradiated onto the workpiece 25, the condenser lens 44 is put on a position adjacent to the LED illuminator 151 of the light generator 141 as shown in solid line of FIG. 6. Then, the illumination light generated by the LED illuminator 151 is refracted by an inner side portion of the condenser lens 44 to be irradiated on the workpiece 25 at a small angle.

On the other hand, for enlarging the illumination angle β, the condenser lens 44 is put on a position remote from the LED illuminator 151 as shown in imaginary line of FIG. 4. Then, the illumination light generated by the LED illuminator 151 is refracted by a peripheral portion of the condenser lens 44 to be irradiated on the workpiece 25 at a large angle.

Incidentally, light volume and irradiation position of the illumination light are adjusted by selectively switching on and off the LED illuminator 151.

According to the second embodiment, following effect can be obtained.

The effects (1) and (2) can also be obtained in the present embodiment.

Further, since the light generator 141 includes the LED illuminator 151 formed in a ring-shape around the center of the optical axis of the imaging optical system 37, an effect similar to the effect (3) of the first embodiment can be obtained. More specifically, the light volume and illumination angle can be easily changed by selectively switching on and off the LED illuminator 151.

Third Embodiment

Next, third embodiment of the present invention will be described below with reference to FIGS. 7 and 8.

In the third embodiment, illumination angle adjuster 242 differs from the illumination angle adjuster 42 of the first embodiment and the rest of the arrangement is the same as the first embodiment.

Figure 7:
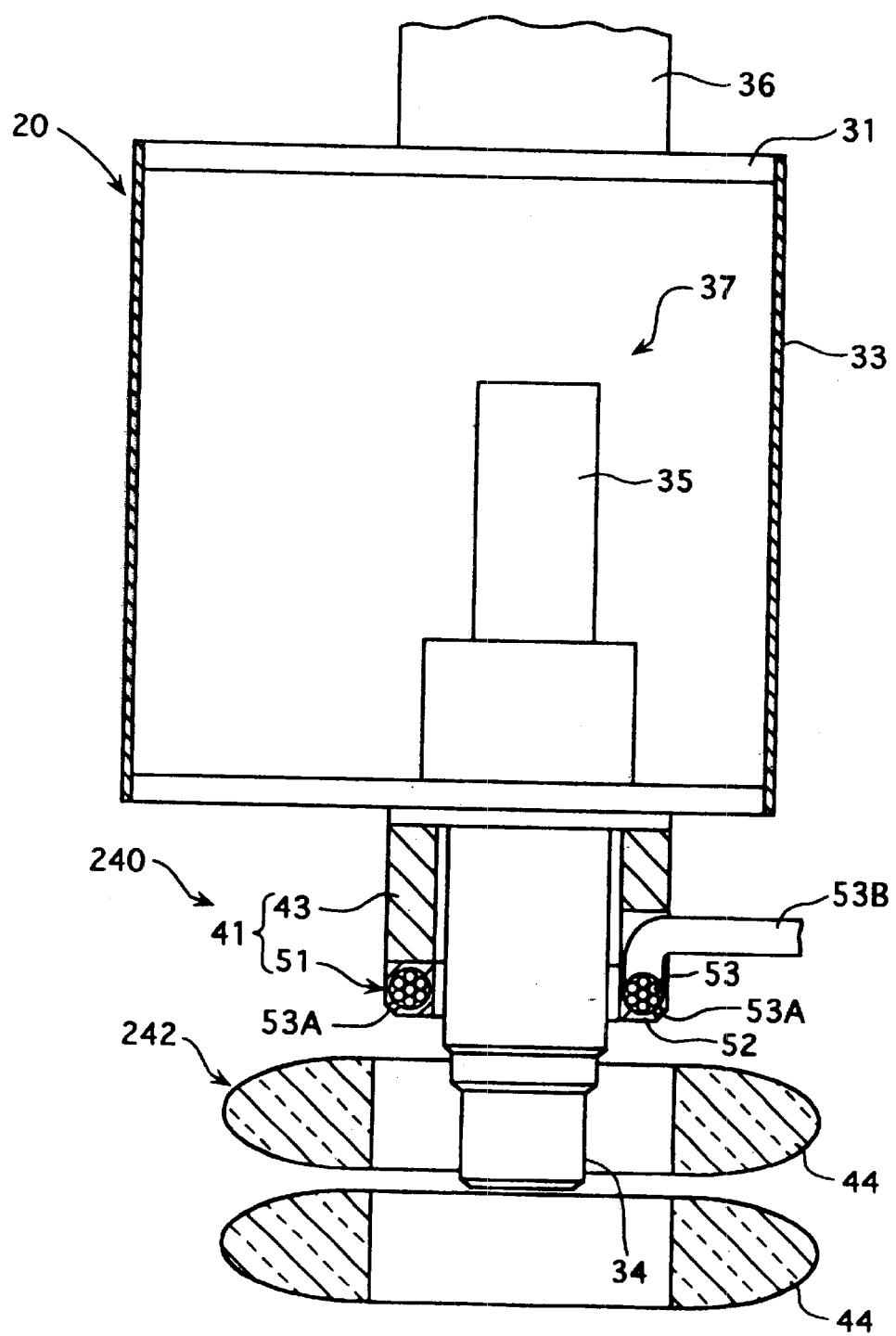
FIG. 7 is a view showing primary portion of the third embodiment of the present invention corresponding to FIG. 2.

In FIG. 7, an illuminator for optical measuring instrument 240 according to the present embodiment is provided to a lower part of the support frame 31 of the microscope 20.

The illuminator for optical measuring instrument 240 includes the light generator 41, and the illumination angle adjuster 242 coaxial with the optical axis of the imaging optical system 37 for condensing the illumination light from the light generator 41 toward the workpiece 25.

The illumination angle adjuster 242 includes a plurality (two in the figure) of the condenser lens 44 for refracting the illumination light from the light generator 41 onto the optical axis, and a driving mechanism (not shown) for manually or automatically moving the condenser lenses 44 vertically along the optical axis.

The condenser lenses 44 are vertically aligned so that the axial cores thereof coincide with the optical axis.

Next, a function of the third embodiment will be described below with reference to FIG. 8.

In initiating measurement, as in the first embodiment, the workpiece 25 is put on the table 22 to oppose the objective 34 and the target portion of the workpiece 25 is located on a focal point of the objective 34.

Figure 8:
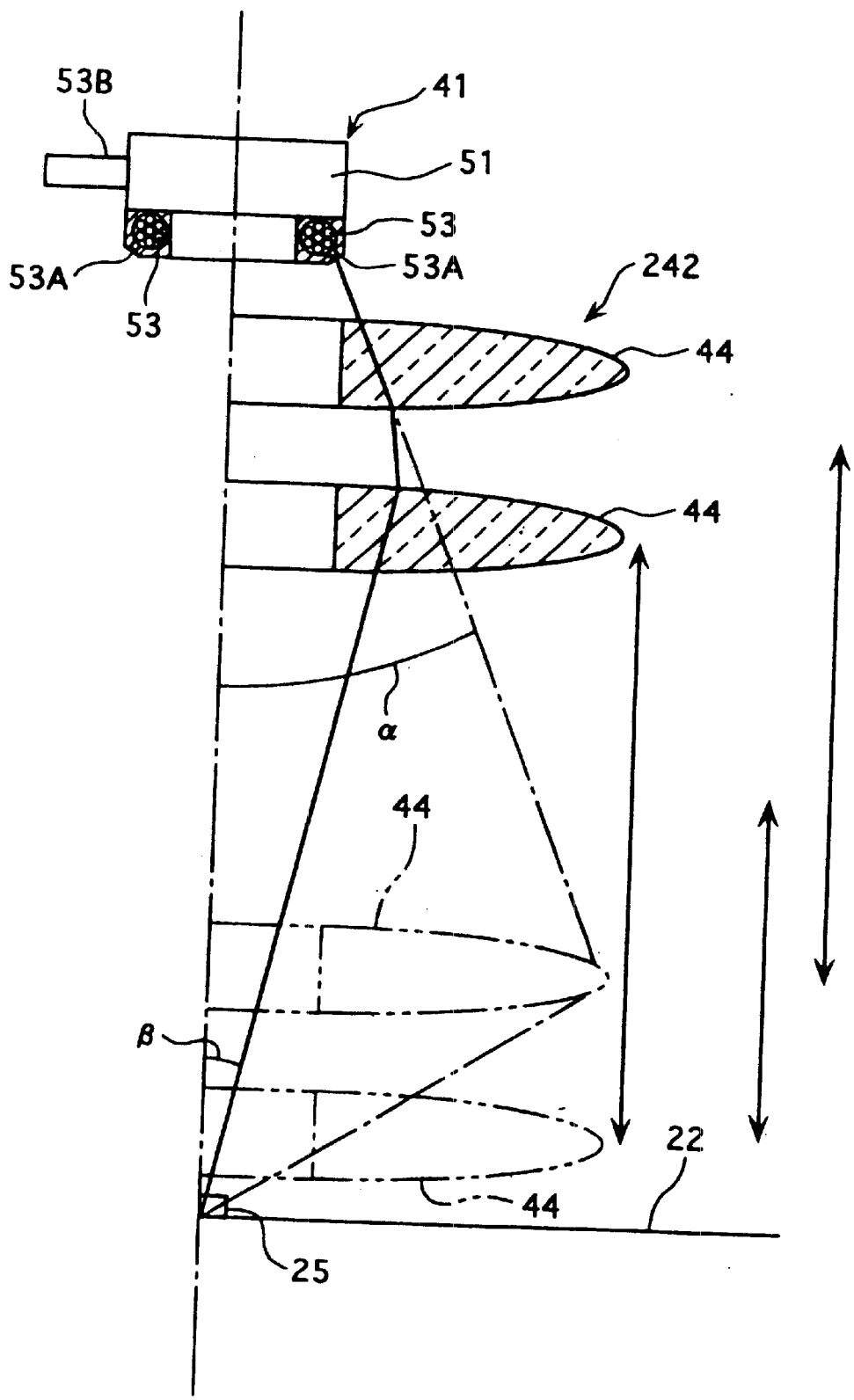
FIG. 8 is a schematic diagram for explaining a function of the third embodiment.

At the above condition, as shown in FIG. 8, the light irradiated from the fiber illuminator 51 of the light generator 41 with a spread angle α from the optical axis is condensed by the two condenser lenses 44 to be irradiated on the workpiece 25.

For changing the illumination angle of the illumination light to the workpiece 25, the two condenser lenses 44 are synchronously or differentially moved along the optical axis by a driving mechanism (not shown).

For instance, for narrowing the illumination angle β of the illumination light irradiated onto the workpiece 25, the two condenser lenses 44 are put on a position adjacent to the fiber illuminator 51 of the light generator 41 as shown in solid line of FIG. 8. Then, the illumination light generated by the fiber illuminator 51 is refracted by inner side portions of the two condenser lenses 44 respectively to be irradiated on the workpiece 25 at a small angle.

On the other hand, for enlarging the illumination angle β, the two condenser lenses 44 are put on a position remote from the fiber illuminator 51 as shown in imaginary line of FIG. 8. Then, the illumination light generated by the fiber illuminator 51 is refracted by peripheral portions of the condenser lenses 44 to be irradiated on the workpiece 25 at a large angle.

According to the third embodiment, following effects can be obtained.

The effects (1), (2) and (3) of the first embodiment can also be obtained in the present embodiment.

Further, since a plurality of the condenser lens 44 is provided, the illumination angle to the workpiece 25 can be fine adjusted by placing the condenser lenses 44 along the optical axis and adjusting relative distance thereof Incidentally, the LED illuminator 151 can be used in the third embodiment instead of the fiber illuminator 51.

Though preferred embodiment of the present invention has been described thus far, the scope of the present invention is not restricted to the specific embodiments but includes other modification and design alteration as long as they can achieve an effect of the present invention.

For instance, though annular lens is used as the condenser lens 44 of the aforesaid embodiments, ordinary lens having axial core integrated with the peripheral portion may be used as long as the light reflected from the workpiece 25 can be transmitted to the imaging optical system 37.

Though optical fiber and LED are used for the light generators 41 and 141, laser device can be used therefor.

Further, the illuminator for optical measuring instrument according to the present invention is not solely used for the tool maker's microscope but may be used for other type of optical measuring instrument such as projector and coordinates measuring instrument.

What is claimed is:

1. An illuminator for optical measuring instrument, comprising:
   a ring shaped light generator for generating illumination light radially from a center of an optical axis of an optical system toward the outside; and
   an illumination angle adjuster for directly condensing the illumination light from the light generator toward a workpiece, the illumination angle adjuster having an annular condenser lens disposed coaxially with the optical axis for refracting the illumination light from the light generator creating a variable angle of incidence upon the workpiece with the illumination angle adjuster movable along the optical axis.

2. The illuminator for optical measuring instrument according to claim 1, wherein the condenser lens is provided in plural.

3. The illuminator for optical measuring instrument according to claim 1, wherein the light generator has a fiber illuminator formed in a ring-shape with the optical axis as a center thereof.

4. The illuminator for optical measuring instrument according to claim 1, wherein the light generator has a LED illuminator formed in a ring-shape with the optical axis as a center thereof.

* * * * *